(12) United States Patent
Thentheruperai et al.

(10) Patent No.: US 7,801,286 B1
(45) Date of Patent: Sep. 21, 2010

(54) METHOD AND SYSTEM FOR MANAGING VOICE MAIL BOXES

(75) Inventors: Balaji S. Thentheruperai, Overland Park, KS (US); Elizabeth C. Roche, Prairie Village, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 949 days.

(21) Appl. No.: 11/611,303

(22) Filed: Dec. 15, 2006

(51) Int. Cl.
*H04M 1/64* (2006.01)

(52) U.S. Cl. ..................................... 379/88.25; 379/68

(58) Field of Classification Search .............. 379/88.22, 379/88.23, 88.25, 67.1, 68
See application file for complete search history.

(56) References Cited

U.S. PATENT DOCUMENTS

| 6,614,887 | B1 | 9/2003 | Satapathy et al. |
| 2003/0059004 | A1 | 3/2003 | Jiang et al. |
| 2006/0062358 | A1* | 3/2006 | Pearson et al. ............. 379/88.2 |
| 2007/0121885 | A1* | 5/2007 | Sin et al. .................... 379/219 |

OTHER PUBLICATIONS

Verizon, Business Call Answering User Guide, http://www22.verison.com/wholesale/attachments/business_guide.pdf, printed from the World Wide Web on Dec. 27, 2005.

CIMCO Communications Inc., An Informational User Guide for: Submailboxes, http://www.cimco.net/CIMCO/PDFs/setting_up_submailboxes.pdf, printed from the World Wide Web on Dec. 27, 2005.

ITC Deltacom, ITC^DeltaCom Voicemail Instructions, http://www.deltacom.com/voicemail/CallSaver%20Extension%20C%20Set-Up%20-%20Comverse.pdf, printed from the World Wide Web on Dec. 27, 2005.

* cited by examiner

*Primary Examiner*—Olisa Anwah

(57) ABSTRACT

An improved arrangement for managing voice mail boxes. A group voice mail account will be defined to include a general mailbox and two or more sub-mailboxes. For each sub-mailbox, the voice mail account will define a respective pass code that can be used as a key for gaining management access to that sub-mailbox and to the general mailbox but not to any other one of the sub-mailboxes. When the voice mail system receives from a user the pass code associated with a given sub-mailbox, the voice mail system will thus allow the user to manage greetings and/or messages associated with the given sub-mailbox and greetings and/or messages associated with the general mailbox, but the voice mail server will not allow the user to manage greetings or messages associated with other mailboxes. Further, upon gaining access to manage the general mailbox, the user may create additional sub-mailboxes.

21 Claims, 7 Drawing Sheets

METHOD AND SYSTEM FOR MANAGING VOICE MAIL BOXES

FIELD OF THE INVENTION

The present invention relates to telecommunications and, more particularly, to management of mailboxes in a voice mail system.

BACKGROUND

Conventional voice mail systems create a mailbox for a person associated with a called telephone number (i.e., the voice mail account "owner"). When incoming calls are unanswered within a certain number of rings, they are directed to a voice mail server, allowing the caller to create a recorded message to be later retrieved by the owner. The owner can typically access their mailbox either from the called telephone or remotely from other telephones in order to manage the mailbox, such as to record a personal greeting, to review message details (e.g., day and time of message), to listen to messages, and to delete messages. In most cases, the owner is required to enter a valid PIN (personal identification number) or other pass code in order to gain access to the mailbox.

Advanced voice mail systems now also allow a voice mail account owner to create and manage sub-mailboxes to which a caller can navigate from a general mailbox. In practice, the owner may record a personal greeting or name announcement respectively for both the general mailbox and each sub-mailbox. When an incoming call arrives at the voice mail system, the system would first play the general mailbox personal greeting to the caller and would allow the caller to either leave a message in the general mailbox or navigate to a sub-mailbox. Upon navigation to a sub-mailbox, the system would then play the associated sub-mailbox personal greeting and would allow the caller to leave a message in the sub-mailbox. The owner may then access the voice mail box and manage (e.g., play out, archive, forward, delete, etc.) any messages left in the general mailbox and any messages left in any created sub-mailboxes.

Conveniently, a voice mail account configured with sub-mailboxes can be used to provide a family voice mail system for a family telephone number, in which each member of the family has a respective sub-mailbox. In practice, a parent may set up a general family mailbox and may further set up a sub-mailbox respectively for each family member. When a caller reaches the family's voice mail, the caller may then leave a message in the general family voice mail box or optionally navigate to the sub-mailbox of a desired family member and leave a message for that family member. A parent or other family member may then access the voice mail box and manage any messages in the general mailbox and any messages in any of the sub-mailboxes. Similar arrangements could be provided for other groups of people (e.g., workers at a company) as well.

A problem with existing voice mail arrangements like this, however, is that each person having a sub-mailbox may be provided with global management access for the entire voice mail account, which would allow the person to manage not only the sub-mailbox (e.g., creating greetings and managing messages) but also the general mailbox and, most troubling, each other sub-mailbox. For instance, in a family scenario, a single pass code may be defined generally for the family voice mail account and may provide global management for both the general family mailbox and each family member's sub-mailbox. Unfortunately, with this arrangement, each member of the family will be able to manage each other member's sub-mailbox, which can be undesirable.

Alternatively, in another arrangement, each sub-mailbox holder may be restricted to manage only the sub-mailbox holder's own sub-mailbox. Yet a problem with that arrangement is that the sub-mailbox holder would be unable to access messages left in the general mailbox, or to otherwise manage the general mailbox. In that case, it would be impossible for a caller to leave a message that all of the sub-mailbox holders could generally access, without leaving the same message in each of the sub-mailboxes.

An improvement is therefore desired.

SUMMARY

The present invention provides an improved arrangement for managing voice mail boxes. According to the invention, a given voice mail account will have a general mailbox and two or more sub-mailboxes. For each sub-mailbox, the voice mail account will define (i.e., have established) a respective pass code that can be used as a key for gaining management access to that sub-mailbox and to the general mailbox but not to any other one of the sub-mailboxes. Optionally, an administrative (or master) pass code may also be defined for the voice mail account, to provide management access to all of the mailboxes of the account, including the general mailbox and each sub-mailbox.

Given a family voice mail account, for instance, each member of the family may have a corresponding sub-mailbox and may have a respective pass code, which the family member may enter into the voice mail system to gain management access. When the voice mail system receives a given one of the family's pass codes that corresponds with a given one of the sub-mailboxes, the voice mail system will grant management access to that sub-mailbox and to the general family mailbox but not to any other one of the family's sub-mailboxes. Optionally, an administrative (or master) pass code may also be defined for the family voice mail account, to provide management access to all of the mailboxes of the account.

With the benefit of the invention, each group (e.g., family) member can manage both the general mailbox and the member's own sub-mailbox, without gaining management access to any other sub-mailbox of the group account. Thus, the invention retains the benefit of the prior art in that each member may manage the general mailbox (e.g., to create greetings and manage messages in the general mailbox, and perhaps also to create further sub-mailboxes), yet the invention provides privacy and security between sub-mailboxes by precluding (or at least endeavoring to preclude) a given sub-mailbox holder from gaining management access to other sub-mailboxes. (Further, in line with this general principle, a sub-mailbox holder's management of the general mailbox could exclude the right to delete others' sub-mailboxes.)

These as well as other aspects and advantages will become more apparent to those of ordinary skill in the art by reading the following detailed description, with reference where appropriate to the accompanying drawings. Further, it should be understood that the description in this summary and in the discussion below is set forth for purposes of example only and therefore does not necessarily limit the scope of the invention as claimed.

DETAILED DESCRIPTION

In accordance with an exemplary embodiment of the invention, a group voice mail account will be defined in data storage of a voice mail system to include a general mailbox for the group and at least two sub-mailboxes for the group. For each mailbox (including the general mailbox and each sub-mailbox), the account will preferably include in data storage a respective greeting and/or name-announcement to greet callers, and any messages left by callers within the mailbox will be stored in data storage and associated with the mailbox. Further, for each sub-mailbox, the account will include in data storage a respective pass code that is usable as a key to gain management access to that sub-mailbox and to the general mailbox but not to any other sub-mailbox of the account.

In operation, when a caller then calls the telephone number associated with the group and gets connected with the voice mail account (e.g., if no one answers the call, or if the caller calls directly to the voice mail system/account), the voice mail system will present the caller with a hierarchy of prompts, through which the caller may navigate. Preferably, the voice mail system will first play a primary greeting defined for the general mailbox, such as "Thank you for calling the Jones family. We are not here to take your call right now." In turn, the voice mail system may then give the caller options to (i) leave a message in the general mailbox or (ii) navigate to one of the sub-mailboxes, with each sub-mailbox being optionally identified by a corresponding, prerecorded name greeting. For instance, the voice mail system may prompt the caller to "Press 1 to leave a message in the general mailbox, press 2 to leave a message for 'Lindsey', or press 3 to leave a message for 'Adam.'"

The caller may thus select one of the options to navigate to a desired mailbox. At that point, the voice mail system may present a greeting associated with the selected mailbox. For example, if the caller selects the general mailbox, the voice mail system may play a secondary greeting defined for the general mailbox, such as "At the tone, please leave a general message for the Jones family." On the other hand, if the caller selects Lindsey's sub-mailbox, the voice mail system may play a greeting defined for that sub-mailbox, such as "Please leave a message for Lindsey at the tone." And if the caller selects Adam's sub-mailbox, the voice mail system may play a greeting defined for that sub-mailbox, such as "Adam is out right now. Please leave a message for him at the tone." The voice mail system may then prompt the caller with a tone to leave a message, and the voice mail system may record a message spoken by the caller in response and store the message in association with the selected mailbox.

Figure 1:
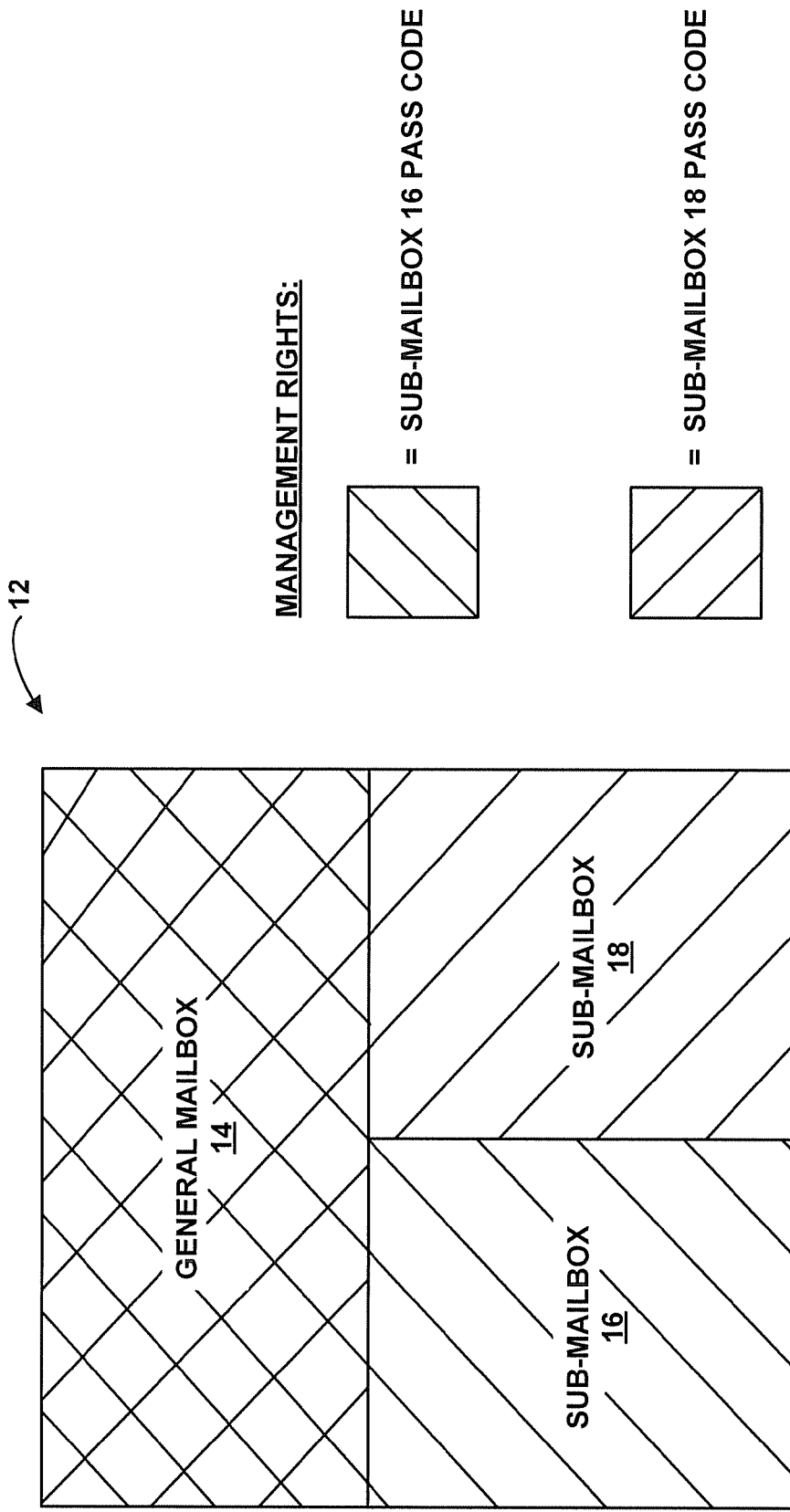
FIG. 1 is a schematic illustration of a group voice mail account with management rights allocated in accordance with the exemplary embodiment.

FIG. 1 depicts schematically an example allocation of management rights for a group voice mail account 12. As shown in FIG. 1, the voice mail account 12 includes a general mailbox 14, and at least two sub-mailboxes 16, 18, with each sub-mailbox having an associated pass code. As indicated by the accompanying legend, the pass code defined for sub-mailbox 16 provides the holder of sub-mailbox 16 with management access for sub-mailbox 16 and also for the general mailbox 14 but not for sub-mailbox 18. Likewise, the pass code defined for sub-mailbox 18 provides the holder of sub-mailbox 18 with management access for sub-mailbox 18 and for the general mailbox 14 but not for sub-mailbox 16.

In this arrangement with a sub-mailbox defined for each group member, each group member will preferably have knowledge of the pass code defined for the member's sub-mailbox. In practice, the sub-mailbox holder may then use the pass code to gain management access to both that sub-mailbox and the general mailbox. To do so initially, the sub-mailbox holder may call into the voice mail account and may interrupt the voice mail system by entering a designated code (such as a pound sign or a spoken word). Alternatively, the sub-mailbox holder may call directly into a management telephone number designated for the voice mail account. Still alternatively, the sub-mailbox holder may call into the voice mail account, and one of the prompt options that the voice mail system presents to the caller may be a management option, such as "Press 7 to manage voice mail," so the sub-mailbox holder could select that option.

In response, the voice mail system may prompt the sub-mailbox holder for entry of a pass code, and the sub-mailbox holder may responsively enter the pass code. When the voice mail system receives the pass code, the voice mail system will detect that the pass code corresponds with a particular sub-mailbox (presumably that held by the caller), and so the voice mail system will responsively grant management access to that sub-mailbox and to the general mailbox, without granting management access to any other one of the group sub-mailboxes.

To grant such management access, the voice mail system may present a prompt that allows the caller to select the general mailbox or the caller's sub-mailbox. For instance, the voice mail system may play a prompt such as "Press 1 to manage the general mailbox, or press 2 to manage the sub-mailbox". Further, if a name greeting is associated with the sub-mailbox, the voice mail system could incorporate that name greeting in the prompt, such as "Press 1 to manage the general mailbox, or press 2 to manage the mailbox of 'Lindsey.'" The sub-mailbox holder may thus select whether to manage the general mailbox or the sub-mailbox, and the voice mail system may then responsively offer options for conducting such management. Further, the voice mail system will preferably allow the sub-mailbox holder, when managing the sub-mailbox, to switch to managing the general mailbox instead, and when managing the general mailbox, to switch to managing the sub-mailbox instead. But preferably, an option will not be provided to manage any other sub-mailbox of the account (unless the proper pass code for such other sub-mailbox is entered).

In accordance with the invention, the act of granting management access to a given mailbox, whether the general mailbox or a sub-mailbox, preferably involves granting management access for mailbox greetings and for messages left in the mailbox. Granting management access for mailbox greetings may involve allowing the caller to work with the voice mail system to record or revise one or more welcome messages (outgoing messages), record or revise one or more name greetings, and/or turn on or off one or more greetings. Granting management access for messages left in the mailbox may involve allowing the caller to direct the voice mail system to play messages, delete messages, forward messages, archive messages, and send replies to messages. The voice mail system may present the caller with various prompts selectable by the user to carry out these or other functions.

Also in accordance with the exemplary embodiment, the act of granting management access to the general mailbox will preferably include allowing the caller to create new sub-mailboxes for the account. To do so in practice, the voice mail system may prompt the caller with the option to create a new sub-mailbox, and the caller may responsively select that option. The voice mail system may then prompt the subscriber to designate a pass code for the new sub-mailbox and to speak one or more greetings, such as a welcome greeting and a name greeting, to be stored and used for the sub-mailbox. Given this input, the voice mail system may thus establish a new sub-mailbox accordingly, and the voice mail system may set the pass code to be usable by a caller to gain management access to (i) the new sub-mailbox and (ii) the general mailbox.

Further, in a preferred embodiment, upon creation of a new sub-mailbox, the voice mail system will update the general mailbox greeting to include an option for a caller to navigate to the new sub-mailbox. For instance, if there were already two sub-mailboxes and the greeting designated options 2 and 3 for a caller to selectively navigate to either of those sub-mailboxes, the voice mail system may automatically add an option 4 for a caller to selectively navigate to the newly created sub-mailbox. In addition, if a name greeting has been defined for the new sub-mailbox, the voice mail system may automatically incorporate that name greeting in the new portion of the general mailbox greeting. For instance, if the name greeting for the new sub-mailbox is "Holly", the added portion of the general mailbox greeting could be "Please press 4 to leave a message for 'Holly.'"

Figure 2:
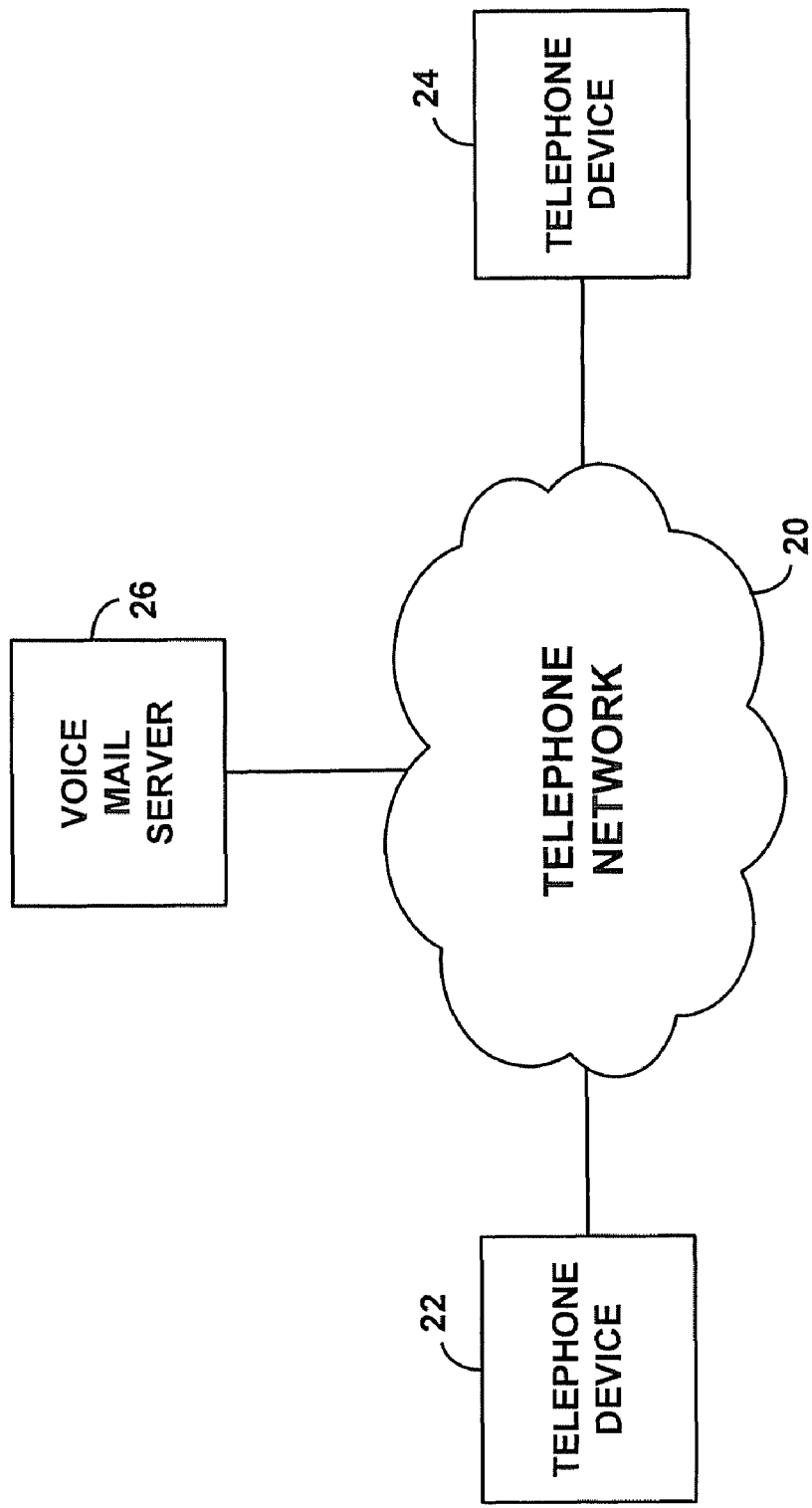
FIG. 2 is a simplified block diagram of a telecommunication system in which the exemplary embodiment may be implemented.

Referring again to the drawings, FIG. 2 depicts an example telecommunication system in which an embodiment may be implemented. As shown, the example system includes at its core a telephone network 20, which functions to interconnect calls between telephone devices, such as devices 22 and 24 for instance. Telephone network 20 may include wireless portions, landline portions, legacy circuit-switched portions, and packet-switched (e.g., voice over IP) portions and may thus generally take any form. Telephone devices 22 and 24 may thus also take various forms, such as landline, wireless telephones, and/or VoIP telephones for instance.

Situated on (or accessible via) telephone network 20 is a voice mail server 26, which may function as the voice mail system of the present invention. As such, the voice mail server 26 may take the form of a single computer server having a telephone network connection circuit, a processor, data storage, and program instructions stored in the data storage and executable by the processor to carry out the various functions described herein. Alternatively, the voice mail server 26 may comprise multiple entities working in combination to carry out the inventive functions.

In the exemplary arrangement, voice mail server 26 may have a voice mail box defined for the telephone number assigned to telephone device 22, and an owner of the voice mail box may access and manage the voice mail box in accordance with the invention. For instance, the owner may call a voice mail access telephone number and, when prompted, enter the assigned telephone number and a pass code so as to access management prompts. Alternatively, if the owner calls from telephone device 22, the voice mail server 26 may detect the applicable telephone number through caller-ID signaling and may then simply prompt the caller to enter a pass code so as to gain management access.

Furthermore, when a user of telephone device 24 calls the telephone number assigned to telephone device 22 and the call goes unanswered (or the line is busy), call processing infrastructure of network 20 may automatically connect the call to voice mail server 26 for handling. The voice mail server 26 may then prompt the caller to leave a voice mail message for the called party, and the voice mail server 26 may receive and store the voice mail message in the voice mail box. Subsequently, the owner may then access the voice mail box to retrieve or otherwise manage the message.

Figure 3:
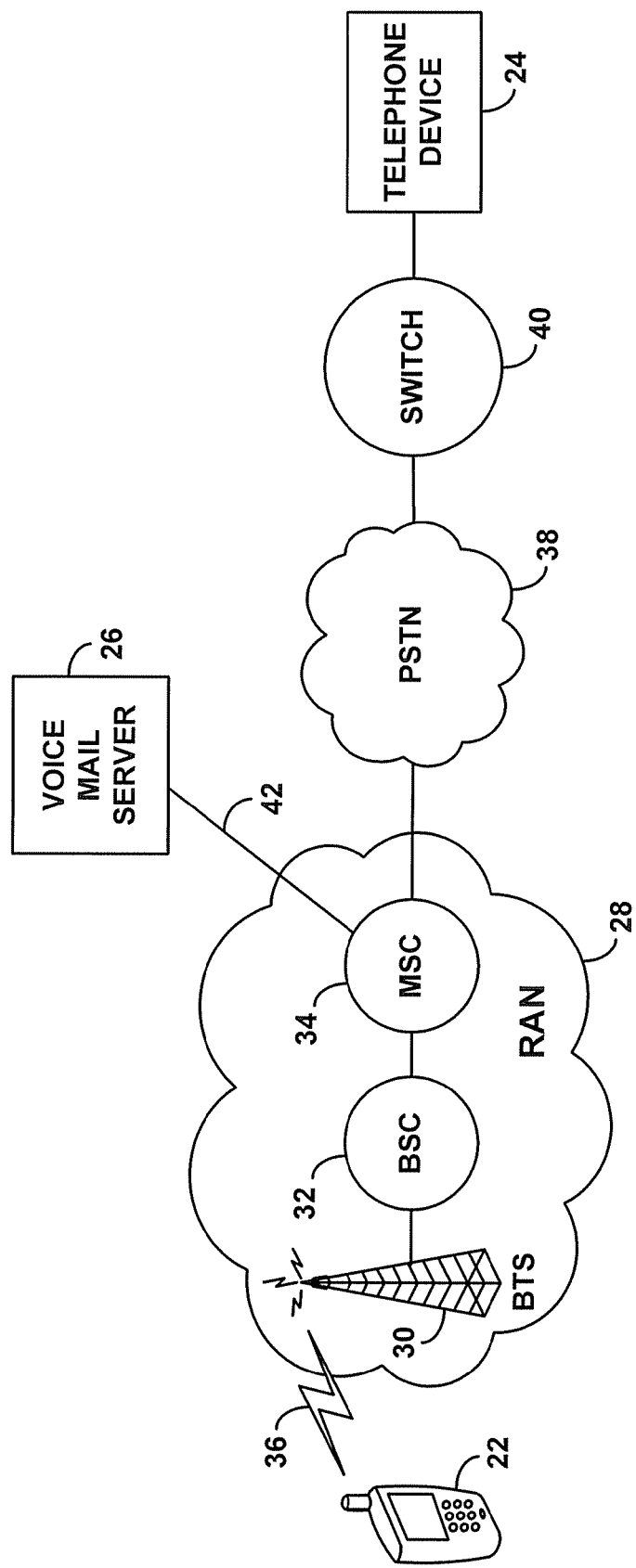
FIG. 3 is another simplified block diagram of a telecommunication system in which the exemplary embodiment may be implemented.

FIG. 3 next depicts a more specific network arrangement in which the exemplary embodiment can be implemented, where telephone device 22 is a cellular wireless communication device, such a cell phone for instance. As shown, cell phone 22 is served by a cellular radio access network 28, which includes a base transceiver station (BTS) 30, a base station controller (BSC) 32, and a mobile switching center (MSC) 34.

In this example arrangement, BTS 30 functions conventionally to communicate over an air interface 36 with cell phone 22, according to an air interface protocol such as CDMA, GSM, WiMax, or any other air interface protocol now known or later developed. BTS 30 is then coupled with BSC 32, which functions to control operation of BTS 30 and to control aspects of communication over the air interface 36. And BSC 32 is then coupled with MSC 34, which functions to connect calls to and from cellular wireless devices in its serving area, such as calls extending over the public switched telephone network (PSTN) 38. With the arrangement as shown, telephone device 24 may be served by another switch 40 on the PSTN 38. Alternatively, telephone device 24 may be another cellular wireless communication device served by MSC 34.

In the arrangement of FIG. 3, the exemplary voice mail server 26 is shown connected by a voice/signaling trunk 42 with MSC 34. In practice, for instance, the voice mail server may be provided as a program application running on a service node tied by a trunk with MSC 34. Alternatively, the voice mail server may be situated in some other way such that calls can be routed to the voice mail server for handling.

As in the generalized arrangement of FIG. 2, voice mail server 26 defines a group voice mail account. In this case, the group voice mail account may be associated with cell phone 22, and cell phone 22 may be shared by a number of users, such as members of a family or workers in an office. Accordingly, a user having a pass code defined for the voice mail account may call into voice mail server 26 from cell phone 22 or from another telephone device and may enter the pass code to gain management access.

Furthermore, when MSC 32 receives a request to connect a call to cell phone 22, MSC 26 may conclude for various reasons (e.g., a no-answer condition, a busy condition, or a do-not-disturb setting) that the call should be routed to voice mail server 26. MSC 32 may then programmatically engage in signaling with voice mail server 18 to set up the call to the voice mail server. In turn, voice mail server 26 may then answer the call and receive and store a voice mail message in the called party's voice mail box, for later retrieval and management by an authorized person.

Although FIGS. 2 and 3 show the exemplary voice mail system as a node (or combination of nodes) sitting on the telephone network and being remotely accessible by various telephone devices, it should be understood that the exemplary voice mail system could just as well be provided elsewhere and could just as well be accessed in other ways.

By way of example, the voice mail system could be situated at the called party's customer premises (e.g., home or office) and could take the form of a specialized answering system, such as a standalone answering-machine device or an answering-machine application running on a personal computer. In that case, when a call to the customer premises telephone line goes unanswered, the voice mail system could be set to automatically answer the call, and the caller could then leave a message, or, if authorized, gain management access. Likewise, the voice mail system could comprise a voice mail server connected with a PBX server or other such call server at an office or other customer premises, and the call server could be set to forward unanswered calls to the voice mail server and/or could provide a special telephone number for calling directly into the voice mail server.

As another example, the voice mail system could comprise a web server or other mechanism that enables users to contact the voice mail system via the Internet, from a conventional web browser for instance. With such an arrangement, an authorized person could gain management access by logging into the voice mail system over the Internet. For instance, the person could browse to a web page defined for the voice mail system, which could prompt the person to enter the telephone number of the voice mail account and the person's pass code. Upon successful validation, the voice mail system may then grant management access to the person and may interact with the person through a series of web page prompts and displays or real-time media presentations. Other variations are possible as well.

Furthermore, it should be understood that the voice mail system could be provided by various entities, such as a cellular wireless carrier, a local exchange carrier, an interexchange carrier, and/or a VoIP telephony provider, for example (with the understanding that a given entity could provide a combination of these or other services). In a preferred arrangement, the voice mail system would be situated at a network point of presence maintained by the service provider. However, it could equally be provided at the customer premises of a customer served by the service provider, or elsewhere.

Figure 4:
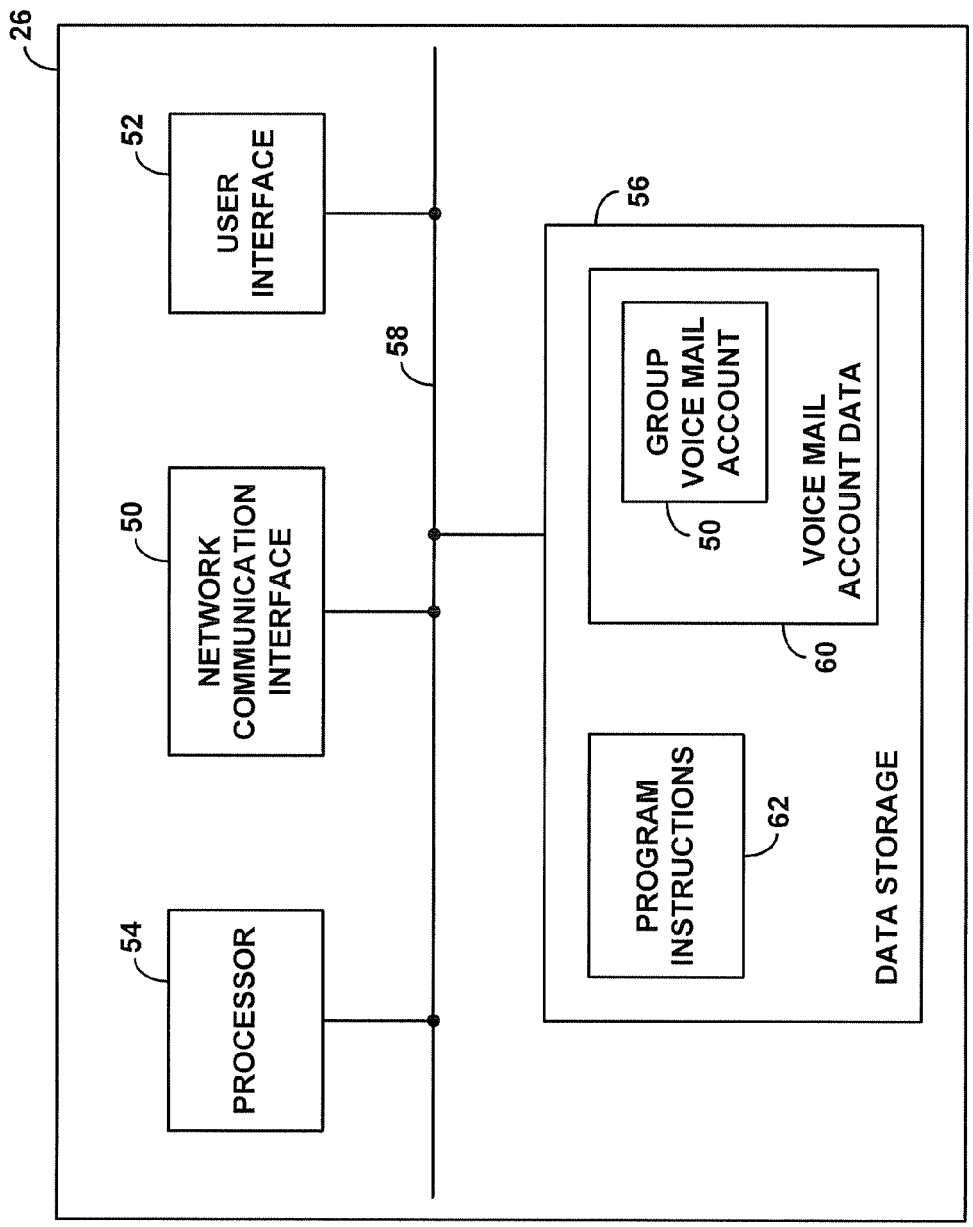
FIG. 4 is a simplified block diagram of a voice mail server arranged to implement the exemplary embodiment.

Referring next to FIG. 4, a simplified block diagram of an exemplary voice mail server 26 is provided, although it should be understood that the voice mail server could take a variety of other forms as well (and, as noted above, the voice mail server may comprise numerous entities operating cooperatively). As shown, the exemplary voice mail server 26 includes a network communication interface 50, a user interface 52, a processor 54, and data storage 56, interconnected together by a system bus, network, or other mechanism 58.

Network communication interface 50 enables connection of voice mail server 26 with one or more telecommunication networks, so that voice mail server 26 can receive calls from people leaving voice mail messages and from people authorized to gain management access in accordance with the invention. As such, network communication interface 50 may support one communication session at a time or may support numerous concurrent sessions. Network communication interface 50 may thus take various forms, such as a high density modem card connectible with numerous T1 lines, or a simple telephone line port, for instance. Further, network communication interface 50 may provide packet-network connectivity to facilitate packet-based communications with the voice mail server 26.

User interface 52 comprises means for interacting with a user, such as a programmer of the voice mail server. As such, user interface 52 may comprise input components such as a keyboard and mouse, and output components such as a display screen and speakers.

Processor 54 comprises one or more general purposes processors (e.g., INTEL, or other microprocessors) and/or one or more special purpose processors (e.g., digital signal processors). And data storage 56, in turn, comprises one or more volatile and/or non-volatile storage components, such as magnetic, optical, organic, or other sorts of data storage now known or later developed, and may be integrated in whole or in part with processor 54. As further shown, data storage 56 contains voice mail account data 60 and program instructions 62 executable by processor 54 to carry out various functions described herein.

Voice mail account data 60 defines one or more voice mail accounts, including at least one group voice mail account 64 arranged in accordance with the invention. As such, voice mail account data 60 defines for the voice mail account 64 a general mailbox and one or more sub-mailboxes as shown in FIG. 1, with each sub-mailbox being hierarchically associated with the general mailbox, such that a caller can navigate to the sub-mailboxes from the general mailbox and can navigate to the general mailbox from each sub-mailbox.

In an exemplary arrangement, the voice mail account data 60 may include for the voice mail account 64 a table of data that lists the general mailbox and each sub-mailbox and provides for each mailbox a respective identifier and other parameters. The data may specify for each mailbox various greetings, prompts, and logical navigation structures, to enable callers to interact with the mailbox such as to record messages, manage the mailbox, and/or navigate to other mailboxes. For instance, the data may specify for the general mailbox a general mailbox greeting and prompts inviting a caller to take various actions, such as to navigate to a sub-mailbox or to manage mailboxes. Likewise, the data may specify for each sub-mailbox a sub-mailbox greeting and prompts inviting a caller to take various actions, such as to navigate to the general mailbox or to manage mailboxes. Greetings and prompts may be stored as audio files, and the data may reference the files by path/filename, or the greetings and prompts may be stored in other ways. Furthermore, the data may specify for each mailbox a data storage space for holding voice mail messages left in the mailbox, or may otherwise link to voice mail messages stored in the mailbox.

In accordance with the exemplary embodiment, the data may specify for each mailbox a respective pass code usable as a key to gain management access. For instance, the data may specify for the general mailbox a master pass code for the voice mail account 64, usable as a key to gain management access to the voice mail account as a whole (including the general mailbox and all of the sub-mailboxes). Furthermore, the data preferably specifies for each sub-mail box a sub-mailbox pass code that is usable as a key to gain management access to the sub-mailbox and to the general mailbox but not to any other sub-mailbox of the account. The voice mail account data 60 may, for instance, include a discrete table that lists these pass codes and that associates each pass code with a respective mailbox. That way, when a caller enters a pass code, the voice mail server 26 can readily validate the pass code by reference to the table and can determine from the table the scope of management rights associated with the pass code.

Figure 5:
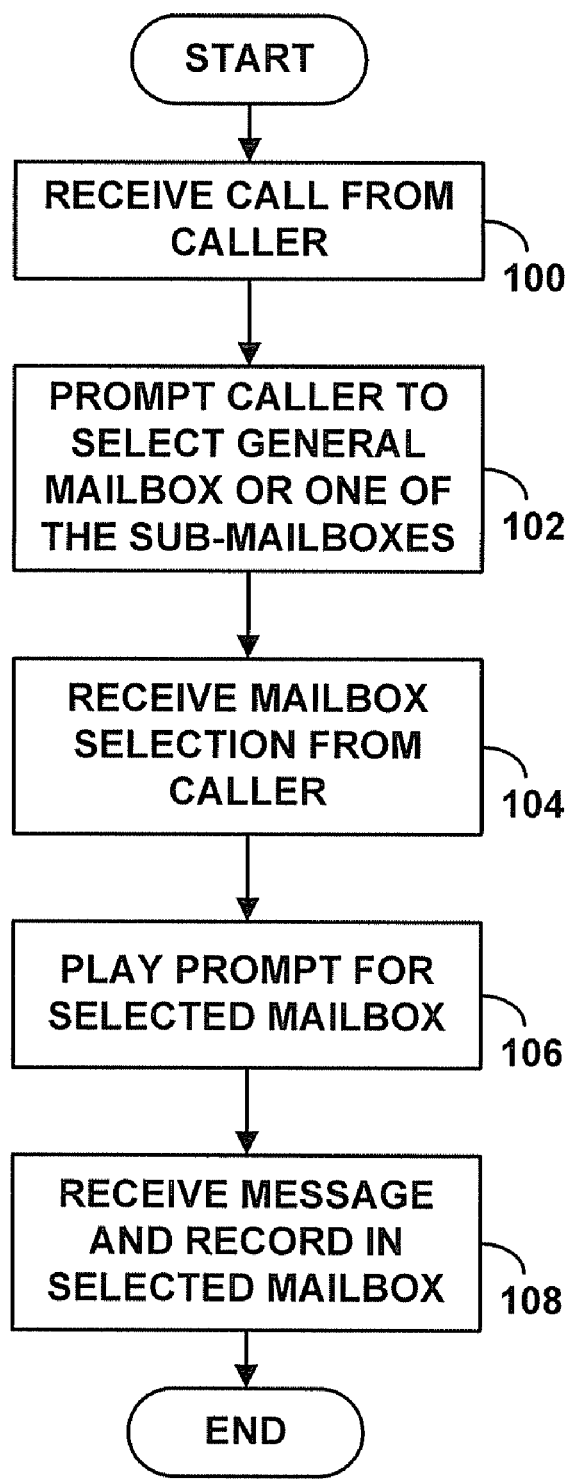
FIGS. 5-7 are flow charts depicting functions that can be carried out in accordance with the exemplary embodiment.

As discussed above, when a caller gets connected to the exemplary voice mail server 26 for the group voice mail account, the voice mail server 26 may play out a general mailbox prompt to the caller and allow the caller to record a message in the general mailbox or navigate to and leave a message in one of the sub-mailboxes. FIG. 5 is a flow chart depicting this process by way of example. (It should be understood that, although this and other processes are described herein in terms of a "caller" to the voice mail system, the same functions could be carried out if a user contacts the voice mail system in some other manner, such as through a web interface or direct PC interface for instance.)

As shown in FIG. 5, at step 100, the voice mail server 26 receives a call from a caller. Upon detecting the voice mail account at issue, at step 102, the voice mail server 26 plays out a general prompt to the caller, such as prompt that directs the caller to select the general mailbox, a first sub-mailbox, or a second sub-mailbox (if not others as well) in which to leave a message. At step 104, the voice mail server 26 then receives a user selection of a desired voice mail box, and at step 106, the voice mail server 26 then plays out a prompt for the selected mailbox, requesting the caller to speak a message to be recorded. At step 108, the voice mail server then receives and records in the selected mailbox the message spoken by the caller, for later retrieval or other management by an authorized person.

Figure 7:
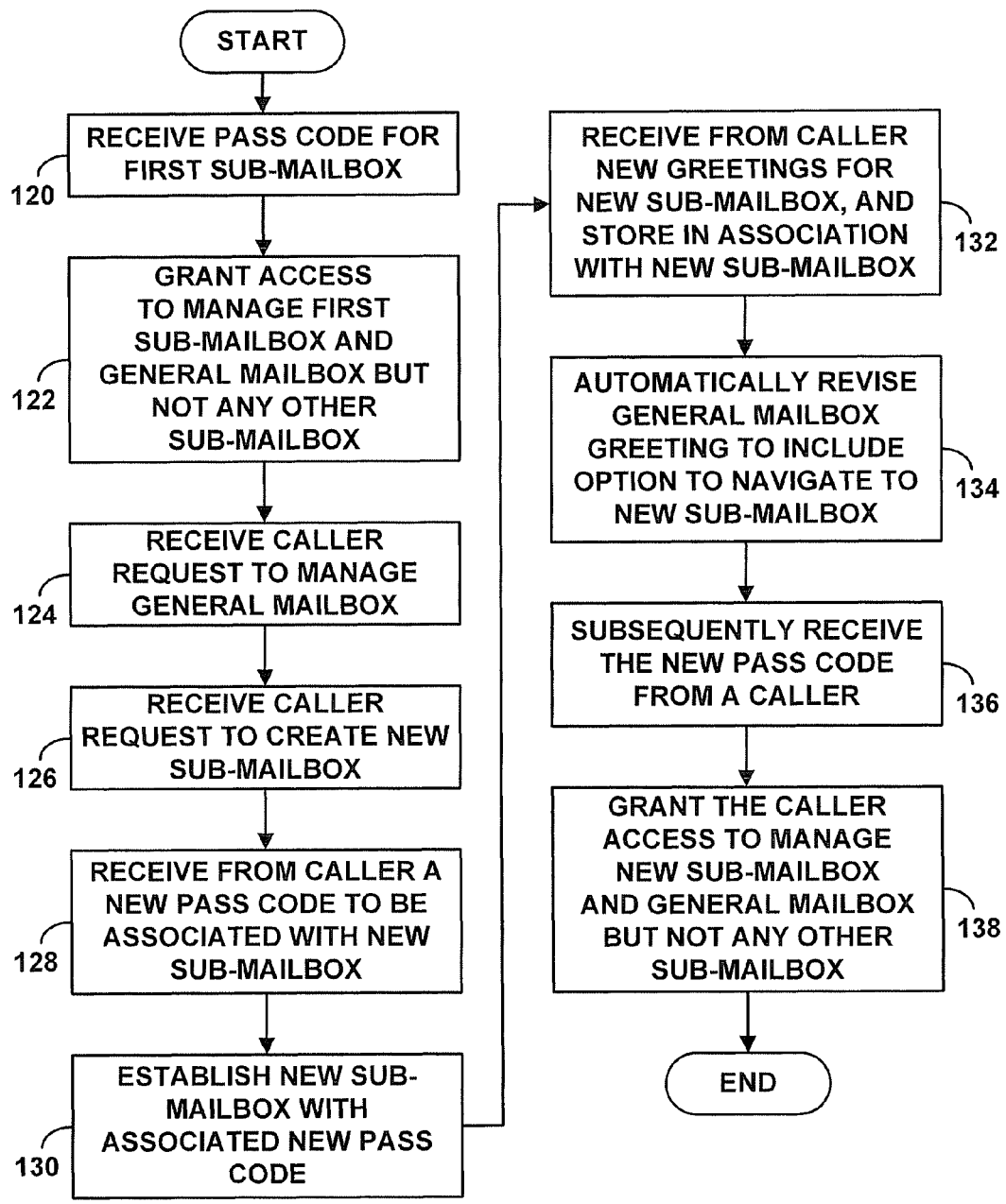

As further discussed above, a caller to the voice mail server may enter a pass code, which may give the caller management access in accordance with the exemplary embodiment. FIG. 7 depicts this process by way of example.

Figure 6:
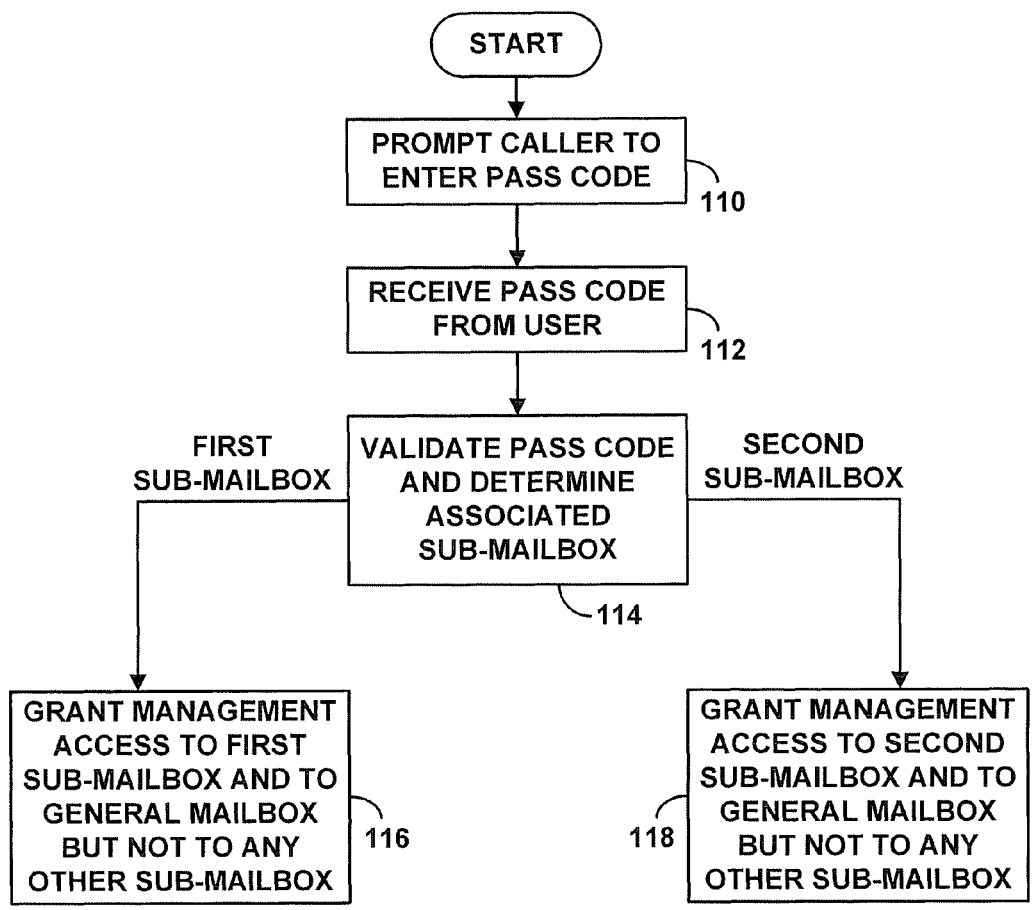

As shown in FIG. 6, at step 110, the voice mail server 26 prompts a caller to enter a pass code. The voice mail server 26 may provide this prompt in response to the caller entering a particular code during normal interaction with the voice mail server, or in response to the caller calling into a management telephone number management telephone number designated for the voice mail account, for instance. At step 112, the voice mail server 26 then receives the pass code entered by the user. At step 114, the voice mail server 26 the refers to voice mail account data 60 to validate the pass code and to determine a mailbox with which it is associated. Assuming the pass code is a sub-mailbox pass code, the voice mail server would thus determine by reference to the voice mail account data the sub-mailbox to which the pass code provides management access.

At step 116, if the voice mail server thereby determines that the pass code is one that provides access to manage a first sub-mailbox of the voice mail account, then the voice mail server will grant the caller access to manage the first sub-mailbox and the general mailbox, but not any other sub-mailbox of the voice mail account. On the other hand, at step 118, if the voice mail server thereby determines that the pass code is one that provides access to manage a second sub-mailbox of the voice mail account, then the voice mail sever will grant the caller access to manage the second sub-mailbox and the general mailbox, but not any other sub-mailbox (such as the first sub-mailbox) of the voice mail account.

As discussed above, the function of granting a caller access to manage the general mailbox preferably comprises granting the caller access to manage one or more general mailbox greetings, granting the caller access to manage any messages left in the general mailbox, and granting the caller access to manage sub-mailboxes, such as to create a new sub-mailbox (but preferably not to delete existing sub-mailboxes—unless the caller provides a master pass code). Granting access to such management functions comprises letting the caller carry out such management functions. Thus, before the voice mail server grants management access to a caller, the voice mail server would not allow the caller to carry out such management functions (e.g., by not presenting prompts for the caller to carry out the functions). However, once the voice mail server grants management access to the caller, the voice mail server would then allow the caller to carry out such management functions (e.g., by presenting prompts for the caller to carry out the functions).

By way of example, before the voice mail server grants the caller access to manage one or more general mailbox greetings, the caller would be unable to establish new general mailbox greetings or to set the active/inactive status of various general mailbox greetings. However, once the voice mail server grants the caller access to manage one or more general mailbox greetings, the voice mail server would then allow the caller to establish new general mailbox greetings. For instance, the voice mail server may then present the caller with prompts (or a navigation structure leading to prompts) to which the caller can respond by directing the voice mail server to establish one or more general mailbox greetings. The caller may then speak one or more general mailbox greetings and the voice mail server may record the greetings for later use. Further, the voice mail server may receive and follow the caller's instruction to set a given greeting as the active general mailbox greeting to be played out to callers connected to the general mailbox.

As another example, before the voice mail server grants the caller access to manage any messages left in the general mailbox, the caller would be unable to direct the voice mail server to play, delete, archive, forward, or reply-to any messages left in the general mailbox (unless the caller is leaving a message and may thus be able to replay the message before finalizing it, or in other such scenarios). However, once the voice mail server grants the caller access to manage any messages left in the general mailbox, the voice mail server may then present the caller with prompts (or a navigation structure leading to prompts) to which the caller can respond by directing the voice mail server to play, delete, archive, forward, reply-to, and/or otherwise deal with messages that have been left in the general mailbox.

Still further, the function of granting the caller access to manage the general mailbox preferably comprises allowing the caller to create a new sub-mailbox hierarchically associated with the general mailbox. FIG. 7 depicts how this process can work in practice.

As shown in FIG. 7, at step 120, the voice mail server initially receives from the caller a pass code associated with a first sub-mailbox of the voice mail account. At step 122, as discussed above, the voice mail server then responsively grants the caller access to manage the first sub-mailbox and a general mailbox of the account, but not a second sub-mailbox of the account. At step 124, the voice mail server then prompts the caller to select between management of the general mailbox and management of the first sub-mailbox, and the voice mail server receives from the caller a request to manage the general mailbox.

At step 126, the voice mail server then prompts the caller with options for managing the general mailbox, including an option to create a new sub-mailbox, and the voice mail server receives from the caller a directive to create a new sub-mailbox. In response to the directive, at step 128, the voice mail server then prompts the caller to create a new pass code for the new sub-mailbox, and the voice mail server receives from the caller (e.g., as DTMF tones or speech) a pass code to be associated with the new sub-mailbox. At step 130, the voice mail server then establishes the new sub-mailbox by adding it to the voice mail account data and reserving any necessary storage space for the sub-mailbox, and the voice mail server stores the new pass code in the voice mail account data in association with the new sub-mailbox, for later reference.

Further, at step 132, the voice mail server prompts the caller to speak one or more greetings for the new sub-mailbox, such as a name greeting (e.g., "Holly") and a message-prompt greeting (e.g., "Holly cannot come to the phone right now. Please leave a message at the tone.") And the voice mail server may receive and store the spoken greetings in the voice mail account data in association with the newly created sub-mailbox. In accordance with the exemplary embodiment, at step 134, the voice mail server then automatically revises the general mailbox greeting to incorporate the new name greeting and/or an option for callers to navigate from the general mailbox to the newly created sub-mailbox. For instance, as discussed above, if the general mailbox greeting prompted callers to select from sub-mailboxes for "Lindsey" and "Adam," the voice mail server may automatically modify the general mailbox greeting to prompt callers to select from sub-mailboxes for "Lindsey", "Adam", and "Holly". The voice mail server may prompt the caller to approve this change before automatically making the change.

Once the voice mail server has created the new sub-mailbox in response to the caller's directive, the voice mail server may then subsequently grant associated management access to the newly created sub-mailbox in the same manner that the voice mail server would grant management access to any other given sub-mailbox in accordance with the exemplary embodiment. In particular, at step 136, the voice mail server may subsequently receive the same or another caller the new pass code, and, at step 138, the voice mail server may responsively grant access to manage the new sub-mailbox and the general mailbox but not the first sub-mailbox and not the second sub-mailbox As further discussed above, the function of granting a caller access to manage a given sub-mailbox (such as the "first sub-mailbox" or the "second sub-mailbox") preferably comprises granting the caller access to manage one or more greetings for the given sub-mailbox and granting the caller access to manage any messages left in the given sub-mailbox.

Thus, before the voice server grants the caller access to manage the sub-mailbox, the caller would be unable to direct the voice mail server to play, delete, archive, forward, or reply-to any messages left in the sub-mailbox (unless the caller is leaving a message and may thus be able to replay the message before finalizing it, or in other such scenarios). However, once the voice mail server grants the caller access to manage any messages left in the sub-mailbox, the voice mail server may then present the caller with prompts (or a navigation structure leading to prompts) to which the caller can respond by directing the voice mail server to play, delete, archive, forward, reply-to, and/or otherwise deal with messages that have been left in the sub-mailbox. On the other hand, provided with the pass code for a given sub-mailbox, the voice mail server would not allow the caller to manage messages in other sub-mailboxes in the group voice mail account.

Further, before the voice mail server grants the caller access to manage a given sub-mailbox, the caller would be unable to manage (e.g., create, delete, or modify) greetings for the sub-mailbox. However, once the voice mail server grants the caller access to manage the sub-mailbox, the voice mail server would allow the caller to establish new sub-mailbox greetings. For instance, the voice mail server may then present the caller with prompts (or a navigation structure leading to prompts) to which the caller can respond by directing the voice nail server to establish one or more sub-mailbox greetings. The caller may then speak one or more sub-mailbox greetings and the voice mail server may record the greetings for later use. Further, the voice mail server may receive and follow the caller's instruction to set a given greeting as the active sub-mailbox greeting to be played out to callers connected to the sub-mailbox. On the other hand, provided with a pass code for a given sub-mailbox, the voice mail server would not allow the caller to manage greetings of other sub-mailboxes in the group voice mail account.

It should be understood that the exemplary voice mail system described herein can be provided by a service provider (e.g., a telecommunication service provider) or could be established by an end-user (e.g., a telecommunication service subscriber). Thus, the service provider and/or the end-user could provide a group voice mail account, with the associated general mailbox, sub-mailboxes, and pass codes usable as described above.

An exemplary embodiment of the invention has been described above. Those skilled in the art will understand, however, that changes and modifications may be made to the embodiment described without departing from the true scope and spirit of the invention, which is defined by the claims.

We claim:

1. A method of managing mailboxes in a voice mail system, the method comprising:
   maintaining mailbox data in data storage, the mailbox data defining at least (i) a plurality of voice mailboxes including at least a general mailbox and two or more sub-mailboxes each hierarchically associated with the general mailbox (ii) a first pass code for the first sub-mailbox, and (ii) a second pass code for the second sub-mailbox;
   receiving from a user a given pass code; and
   if the received pass code is the first pass code, granting the user access to manage the first sub-mailbox and the general mailbox but not the second sub-mailbox; and
   if the received pass code is the second pass code, then granting the user access to manage the second sub-mailbox and the general mailbox but not the first sub-mailbox.

2. The method of claim 1, wherein receiving the given pass code from the user comprises receiving a call from the user, presenting the user with a prompt to enter a pass code, and receiving from the user the given pass code entered by the user in response to the prompt.

3. The method of claim 2, further comprising querying the mailbox data to determine which pass code was received.

4. The method of claim 1, wherein granting the user access to manage the general mailbox comprises granting the user access to manage one or more general mailbox greetings and granting the user access to manage any messages left in the general mailbox.

5. The method of claim 4, wherein granting the user access to manage the general mailbox further comprises allowing the user to create a new sub-mailbox hierarchically associated with the general mailbox.

6. The method of claim 5, further comprising:
   receiving from the user a request to create the new sub-mailbox; and
   responsive to the request, engaging in a process with the user to establish the new sub-mailbox, including (i) receiving from the user a new pass code for the new sub-mailbox, and storing the new pass code in the data storage in association with the new sub-mailbox and (ii) receiving from the user a spoken name greeting for the new sub-mailbox, and storing the spoken name greeting in the data storage in association with the new sub-mailbox.

7. The method of claim 6, wherein the process to establish the new sub-mailbox further comprises automatically revising a general mailbox greeting to include a prompt offering an option for navigation to the new sub-mailbox.

8. The method of claim 6, further comprising:
   subsequently receiving the new pass code, and responsively granting access to manage the new sub-mailbox and the general mailbox but not the first sub-mailbox and not the second sub-mailbox.

9. The method of claim 4, wherein granting the user access to manage one or more general mailbox greetings comprises:
allowing the user to direct the voice mail system to establish one or more general mailbox greetings; and
allowing the user to direct the voice mail system to set a status of one or more general mailbox greetings.

10. The method of claim 4, wherein granting the user access to manage any messages left in the general mailbox comprises:
allowing the user to direct the voice mail system to play, delete, archive, forward, or reply-to any messages left in the general mailbox.

11. The method of claim 1,
wherein the user access to manage the first sub-mailbox comprises granting the user access to manage one or more greetings for the first sub-mailbox and granting the user access to manage any messages left in the first sub-mailbox; and
wherein the user access to manage the second sub-mailbox comprises granting the user access to manage one or more greetings for the second sub-mailbox and granting the user access to manage any messages left in the second sub-mailbox.

12. The method of claim 11,
wherein granting the user access to mange any messages left in the first sub-mailbox comprises allowing the user to direct the voice mail system to play, delete, archive, forward, or reply-to any messages left in the first sub-mailbox; and
wherein granting the user access to mange any messages left in the second sub-mailbox comprises allowing the user to direct the voice mail system to play, delete, archive, forward, or reply-to any messages left in the second sub-mailbox.

13. The method of claim 1,
wherein granting the user access to manage the first sub-mailbox and the general mailbox but not the second sub-mailbox comprises not allowing the user to manage greetings and messages for the second sub-mailbox; and
wherein granting the user access to manage the second sub-mailbox and the general mailbox but not the first sub-mailbox comprises not allowing the user to manage greetings and messages for the first sub-mailbox.

14. The method of claim 1, wherein the mailbox data further defines a master pass code usable as a key to gain management access to the general mailboxes and each of the two or more sub-mailboxes.

15. In a voice mail system, a method comprising:
providing a voice mail account for a telecommunications subscriber, and associating with the voice mail account a general mailbox and a plurality of sub-mailboxes including at least a first sub-mailbox and a second sub-mailbox;
associating with the voice mail account a first access code for the first sub-mailbox and for the general mailbox, wherein upon receipt of the first access code, the voice mail system allows user access to manage the first sub-mailbox and the general mailbox but not the second sub-mailbox; and
associating with the voice mail account a second access code for the second sub-mailbox and for the general mailbox, wherein upon receipt of the second access code, the voice mail system allows user access to manage the second sub-mailbox and the general mailbox but not the first sub-mailbox.

16. A voice mail system comprising:
a network communication interface;
a processor;
data storage;
a group voice mail account defined in the data storage and including a general mailbox and a plurality of sub-mailboxes each hierarchically associated with the general mailbox;
program instructions stored in the data storage and executable by the processor to receive a pass code from a user, to determine that the pass code is associated with a given one of the sub-mailboxes, and to responsively grant the user access to manage the given sub-mailbox and the general mailbox but not any other one of the sub-mailboxes.

17. The voice mail system of claim 16, wherein, when the program instructions are executed to grant the user access to manage the given sub-mailbox but not any other one of the sub-mailboxes, the program instructions allow the user to manage one or more greetings for the given sub-mailbox but not for any other one of the sub-mailboxes, and the program instructions allow the user to manage one or more messages in the given sub-mailbox but not in any other one of the sub-mailboxes.

18. The voice mail system of claim 16, wherein, when the program instructions are executed to grant the user access to manage the general mailbox, the program instructions allow the user to direct the voice mail system to establish a new sub-mailbox and an associated new pass code, wherein the new pass code is usable as a key to gain access to manage the new sub-mailbox and the general mailbox but not any other one of the sub-mailboxes.

19. The voice mail system of claim 16, wherein the voice mail system is situated in a cellular wireless carrier network.

20. The voice mail system of claim 16, wherein the voice mail system is situated at customer premises.

21. The voice mail system of claim 16, wherein the voice mail system is operated by service provider comprising one selected from the group consisting of a cellular wireless carrier, a local exchange carrier, an interexchange carrier, and a VoIP telephony provider.

* * * * *